United States Patent Office 2,838,350
Patented June 10, 1958

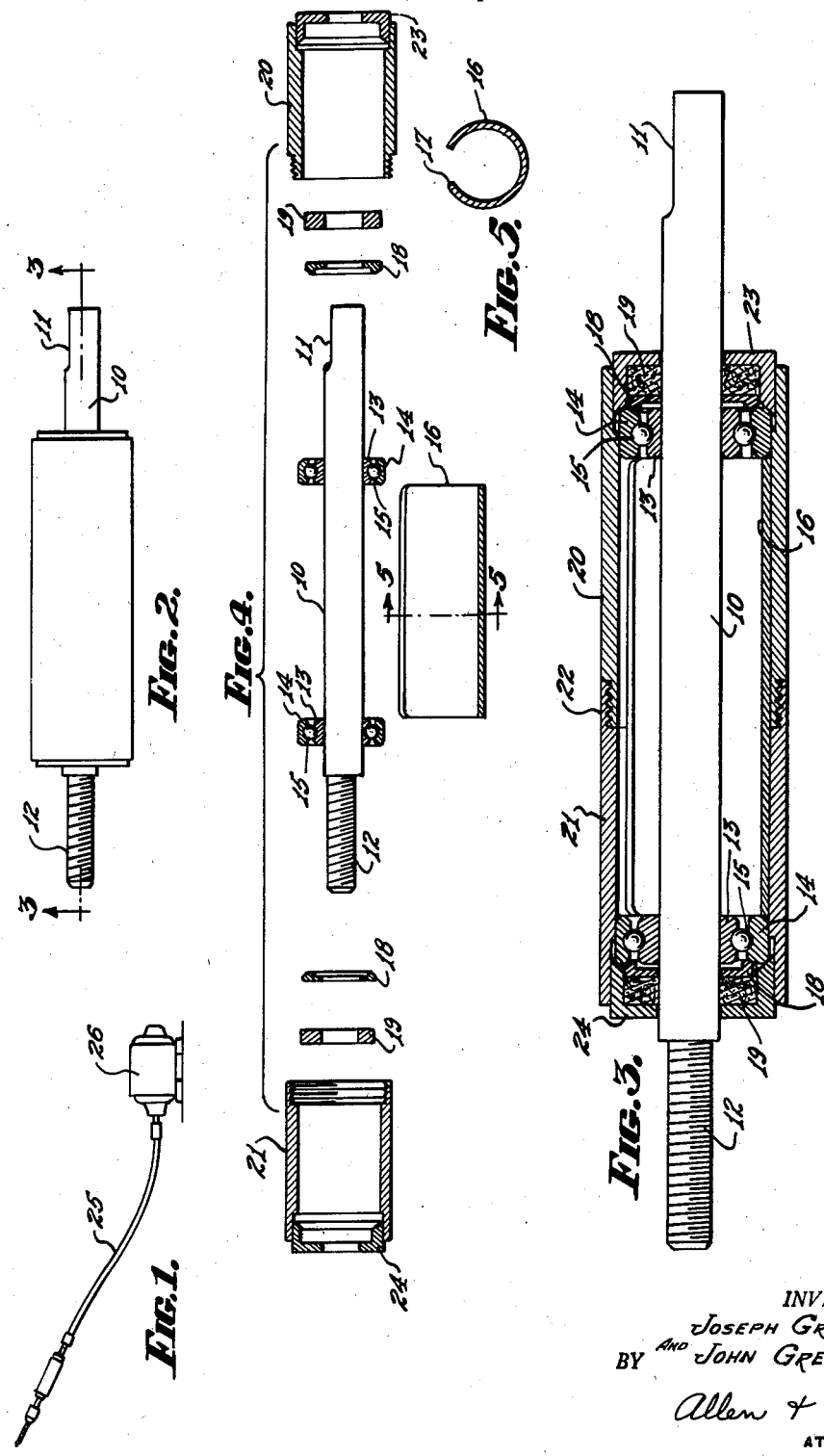

2,838,350

TOOL SPINDLE

Joseph Grewe and John Grewe, Cincinnati, Ohio

Application September 14, 1955, Serial No. 534,300

2 Claims. (Cl. 308—189)

Our invention resides in the provision of a tool spindle which may be fastened in a lathe attachment or which may be held in the hand.

An important object of our invention is to provide a tool spindle capable of performing many kinds of work.

Another object of our invention is to provide a spindle particularly adapted to receive a grinding wheel.

Yet another object of our invention is to provide a tool spindle rotatably mounted in a novel housing which can safely be held in the hand and which is capable of being rigidly fastened in a lathe attachment.

Another important object of our invention is to provide a spindle which is economical to manufacture, simple to assemble and easy to use.

These and other objects will become more apparent to those skilled in the art from a reading of the following description and with reference to the accompanying drawings. In these drawings like numerals are employed to designate like parts throughout and—

Figure 1 is a perspective view showing the tool spindle of this invention as driven by a motor through a flexible drive cable, Figure 2 is a side elevation of the tool spindle of this invention.

Figure 3 is an enlarged section on the line 3—3 of Figure 2,

Figure 4 is an exploded sectional view showing the assembly of the spindle of this invention, and Figure 5 is a section on the line 5—5 of Figure 4.

Referring now to the drawings it will be apparent that our tool spindle includes a shaft 10 formed at one end as indicated at 11 to receive a drive connection to a source of power and provided at the other end with threads 12 by which a suitable tool may be fastened to the shaft. A pair of ball-bearings are tightly pressed on the shaft 10. Each of these bearings includes an inner race 13, an outer race 14 and a plurality of balls 15. These bearings are spaced apart by a split sleeve 16 the slot 17 of which is wide enough to pass around the shaft 10 as will be described more fully shortly.

A washer 18 is provided adjacent the outer side of each of the ball-bearing assemblies. Adjacent the metal washer 18 is a felt washer 19 which serves as a grease seal. The housing for the body of the shaft and its bearings is comprised of two sleeves 20 and 21 which are suitably threaded for engagement one with the other. This is best indicated at 22 in Figure 3. Caps 23 and 24 are pressed into the outer ends of the sleeves 20 and 21 respectively.

In order to assemble the tool spindle one first presses on one of the bearing assemblies 13–15. The spacer sleeve 16 is then placed around the shaft 10 so that it abuts this particular bearing assembly. The second bearing assembly is then pressed on the shaft 10 in abutting relationship with the sleeve 16. The metal washers 18 and felt washers 19 are then slipped on the shaft against the outer sides of the respective bearing assemblies. The sleeves 20 and 21 forming the housing may then be placed about the shaft and screwed tightly together. The caps 23 and 24 may then be pressed into the ends of these sleeves and into engagement with the outer races 14 of the bearing assemblies. Prior to this the interior of the mechanism will have been filled with grease or other suitable lubricant.

If for any reason it should become necessary to take apart the tool this may be accomplished easily. One simply unscrews the housing sleeves 20 and 21 after which the spacer sleeve 16 may be removed from between the bearing assemblies by reason of the slot 17 being wider than the diameter of the shaft 10. Thus it will be apparent that it is easy to get at the bearing assemblies should they need attention. At the same time such arrangement of the housing sleeves 20 and 21, the spacer sleeve 16 and the pressed-in caps 23 and 24 insures proper positioning of the bearing assemblies during operation of the tool.

It will also be apparent that one may either grasp the tool housing by hand and manipulate the tool spindle or such housing can be fastened in a suitable lathe attachment. It is believed that the operation of this tool spindle has been adequately described and further detail is not necessary. Obviously the drive connection to the portion 11 of the shaft 10 may be by flexible cable 25 from a motor 26 as indicated in Figure 1 or a pulley or other member could be directly fastened to such shaft.

Obviously modifications may be made in our invention without departing from the scope and spirit thereof. It should be understood that although we have shown our invention as embodied in particular arrangements and certain structures we do not intend to be limited thereby except insofar as these arrangements and structures are specifically set forth in the subjoined claims.

Having thus described our invention, what we claim as new and what we desire to protect by United States Letters Patent is:

1. A tool spindle comprising a tool holding shaft, a pair of bearings fixed on said shaft, a housing engaged over said bearings, and a spacer sleeve between said bearings, said sleeve having a longitudinal slot therein greater in width than the diameter of said shaft.

2. A tool spindle comprising a tool holding shaft, a pair of bearings fixed on said shaft, a longitudinally slotted spacer sleeve between said bearings, the slot of said sleeve having a width greater than the diameter of said shaft, grease retaining means adjacent said bearings, a two piece cylindrical housing engaged over said bearings, said two piece housing consisting of a pair of sleeves threaded for tight engagement one with the other between said bearings, and a cap in each end of said housing, said shaft extending through both of said caps.

References Cited in the file of this patent

UNITED STATES PATENTS

| 1,457,954 | Batcheller | June 5, 1923 |
| 1,747,085 | Roy | Feb. 11, 1930 |
| 1,926,999 | Keller | Sept. 12, 1933 |
| 2,467,416 | Worel | Apr. 19, 1949 |
| 2,683,341 | Kock | July 13, 1954 |

FOREIGN PATENTS

| 297,453 | Germany | Apr. 17, 1917 |
| 247,677 | Great Britain | Feb. 25, 1926 |